R. W. AMOS.
PROCESS FOR THE DISPOSITION OF GARBAGE, SLUDGE, AND LIKE SUBSTANCES.
APPLICATION FILED DEC. 17, 1910.
1,165,368.
Patented Dec. 21, 1915.
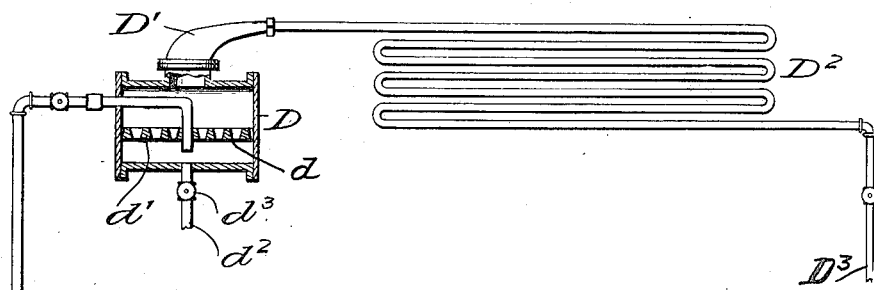
Fig. 1.
Fig. 2.
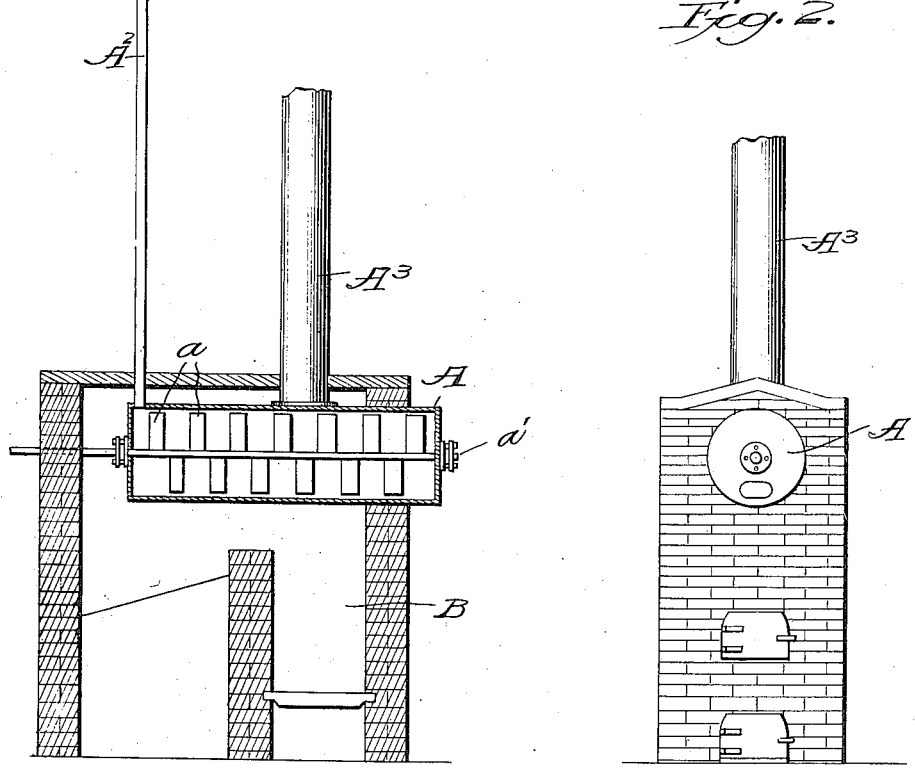
WITNESSES
INVENTOR
Richard W. Amos
by Jos. F. O'Brien
Attorney

UNITED STATES PATENT OFFICE.

RICHARD W. AMOS, OF BROOKLYN, NEW YORK, ASSIGNOR TO NATIONAL PURIFICATION COMPANY, A CORPORATION OF NEW YORK.

PROCESS FOR THE DISPOSITION OF GARBAGE, SLUDGE, AND LIKE SUBSTANCES.

1,165,368.

Specification of Letters Patent. Patented Dec. 21, 1915.

Application filed December 17, 1910. Serial No. 597,841.

*To all whom it may concern:*

Be it known that I, RICHARD W. AMOS, a citizen of the United States, and a resident of Brooklyn, in the county of Kings and State of New York, have invented certain new and useful Improvements in Processes for the Disposition of Garbage, Sludge, and like Substances, of which the following is a specification.
This invention relates to improvements in process and apparatus for the disposition of garbage, sludge, and like substances.

By my invention I take a certain quantity or charge of garbage, consisting of vegetable or dead animal matter and other like substances and treat the same with a suitable chemical, which when heated and agitated, as hereinafter described, will release the vapors of ammonia, alcohol and phosphoric acid gas.

Figure 1 is a vertical section of an apparatus suitable for the carrying out of my process; and Fig. 2 is a front elevation of the same.

I preferably so treat the material with powdered calcium oxid or lime, then charge with the material so treated, through a charging pipe $A^3$ a suitable tank or retort A containing suitable agitating means, such as the arms $a$ mounted on a suitable shaft $a'$ operated by any suitable source of power, not shown. This tank is then heated by any suitable means, preferably by means of the furnace B. To procure the best results the mass should be heated to a temperature of approximately 225° Fahrenheit. Upon such heating and agitation the vapors of alcohol, ammonia and phosphoric acid gas are driven off and separated by suitable means. As shown, I provide a reservoir D which is provided with a perforated plate $d$, on top of which plate is placed a suitable quantity of powdered chemical, preferably composed of two parts of lime to one part of nitrate salt. Such nitrate salt is preferably obtained from the gun-powder mills in the form of refuse, and is composed chiefly of sodium chlorid, sodium nitrate, potassium nitrate and potassium sulfate. In this refuse this salt is impure, that is to say, it is combined with certain other ingredients but it serves my purpose equally as well, which purpose at this particular step of the process is to form with the lime a clarifying and filtering bed on the perforated plate for the ammonia liquors.

The three gases, to wit: vapors of ammonia, alcohol and phosphoric acid are simultaneously driven off through a pipe $A^2$ which is led through the reservoir D and the nozzle or mouth of which extends below said perforated plate $d$. When these gases are driven through said pipe the vapors of alcohol condense in the chamber below the perforated plate $d$ and may be tapped through a suitable pipe $d^2$ provided with a suitable flange $d^3$. The vapor of ammonia rises through the perforated plate $d$ and through the powdered chemicals forming a bed on the top of the same and passes through the pipe D′ and through the condensing coil $D^2$ to a suitable discharge pipe $D^3$. I preferably run these ammonia liquors into a tank containing sulfuric acid, so as to form a solution of ammonium sulfate which when evaporated gives ammonium sulfate in the form of a salt suitable for use as a fertilizer. I may, however, pass this ammonia liquor into nitric acid or other suitable combining agent to produce other suitable ammonium compounds. When the vapors from the pipe $A^2$ arise through the powdered chemicals in the reservoir D, the said lime and nitrate salts absorb the phosphoric acid and form a phosphate of lime, which may thereupon be removed from the reservoir or separating tank and used for fertilizer or any other suitable use.

Having driven off, by heat and agitation all the vapors of ammonium and alcohol, as well as the phosphoric acid that is possible to be driven off from the charge contained in the retort A, I preferably then remove this charge from such retort in any suitable manner, and treat it with suitable chemicals to form a combustible mixture. For this purpose, I preferably employ a mixture of sulfur, calcium, oxid and nitrate salts—the said nitrate salts being obtained from the refuse of gun powder mills, as aforesaid—in the following proportions to wit: one part rock sulfur, two parts calcium oxid and two parts of the nitrate salts aforesaid. When this mixture is fed into the furnace B a perfect combustion is obtained and the ash from the same contains a very large percentage of sulfate of potash, from which the potash is readily separable, in other words, the ash is rich in available potash and this potash is preferably used for fertilizing purpose, or any other suitable purpose. I furthermore, provide suitable means for collecting the gases, which gases are emitted through a chimney (not shown) of the furnace. For this purpose, I preferably provide a device which forces the gases rising from the chimney through water. I have found that by the use of such a device I may procure a blue dye which may be used for any suitable purpose.

Having described my invention I claim:—

1. The process of garbage disposition which comprises the treating of a suitable quantity of garbage with lime, heating the same to drive off the vapor contents thereof and then separating the lighter from the heavier vapors.

2. The process of garbage disposition which comprises the treating of a suitable quantity of garbage with lime, charging a suitable tank with such material, heating the tank to drive off the vapor contents thereof and conducting such vapors to cause the lighter vapors to pass through a bed of material having lime as its characteristic component.

3. The process of garbage disposition which comprises the treating of a suitable quantity of garbage with lime, charging a suitable tank with such material, heating the tank to drive off the vapor contents thereof, conducting such vapors to cause the lighter vapors to pass through a bed of material having lime as its characteristic component, condensing the heavier vapors and permitting the same to be tapped off without passing through such bed.

4. In a process for the disposition of garbage, the step of adding a mixture having a nitrate salt and lime as its principal ingredients to a charge of garbage from which the volatile matter has been removed to form a combustible material.

5. The process of treating a charge of garbage from which the volatile matter has been removed with a mixture having nitrate salt and lime as its principal ingredients to form a combustible material and then burning such material.

6. The process of garbage disposal, which consists in subjecting to heat a charge of material to drive off volatile matter, then adding a mixture having a nitrate salt and lime as its principal ingredients to the residue and then burning such residue.

7. The process of forming a combustible material, which comprises, first, subjecting a charge of garbage to heat to drive off all volatile matter and second, mixing the residue with a mixture having a nitrate salt and lime as its principal ingredients.

8. The process of garbage disposition which comprises, first, treating a suitable charge of material with powdered lime, then subjecting said charge to heat in a suitable tank or retort to drive off the vapor contents thereof, separating the lighter from the heavier vapors, removing the residue from the retort, mixing the residue with a mixture having a nitrate salt and lime as its principal components and then burning the mixture so formed to heat a succeeding charge.

9. The process of garbage disposition which comprises, first, treating a suitable charge of material with powdered lime, then subjecting said charge to heat in a suitable tank or retort to drive off the vapor contents thereof, separating the lighter from the heavier vapors, removing the residue from the retort, mixing such residue with a mixture composed of sulfur, lime and nitrate salts, and then burning the mixture so formed to heat a succeeeding charge.

10. The process of garbage disposition which comprises, first, treating a suitable charge of material with powdered lime, then subjecting said charge to heat in a suitable tank or retort to drive off the vapor contents thereof, separating the lighter from the heavier vapors, removing the residue from the retort, mixing such residue with a mixture composed of one part of sulfur, two parts of lime and two parts nitrate salts, and then burning the mixture so formed to heat a succeeding charge.

In witness whereof, I have signed my name to the foregoing specification in the presence of the subscribing witnesses.

RICHARD W. AMOS.

Witnesses:
 JOSEPH F. O'BRIEN,
 JAS. L. SKIDMORE,
 MAY M. PLYER.